United States Patent
Horbaschek

(10) Patent No.: US 7,142,706 B2
(45) Date of Patent: Nov. 28, 2006

(54) METHOD FOR PROCESSING A RADIATION IMAGE SEQUENCE COMPOSED OF A NUMBER OF SUCCESSIVELY ACQUIRED RADIATION IMAGES ACQUIRED WITH A DYNAMIC IMAGE CONVERTER

(75) Inventor: Heinz Horbaschek, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 763 days.

(21) Appl. No.: 10/382,693

(22) Filed: Mar. 6, 2003

(65) Prior Publication Data
US 2003/0210835 A1  Nov. 13, 2003

(30) Foreign Application Priority Data
Mar. 6, 2002  (DE) ................ 102 09 841

(51) Int. Cl.
*G06T 5/10* (2006.01)
(52) U.S. Cl. ............................. 382/132; 382/260
(58) Field of Classification Search ............ 382/132, 382/260, 261, 280, 284; 378/95, 98.12
See application file for complete search history.

(56) References Cited

U.S. PATENT DOCUMENTS

| | | | |
|---|---|---|---|
| 4,141,032 A | 2/1979 | Haeusler | 358/89 |
| 5,553,157 A * | 9/1996 | Bourguignon et al. | 382/131 |
| 5,880,767 A | 3/1999 | Liu | 347/251 |
| 5,909,515 A * | 6/1999 | Makram-Ebeid | 382/260 |
| 5,911,012 A * | 6/1999 | Bernard et al. | 382/260 |
| 6,252,931 B1 | 6/2001 | Aach et al. | 378/98.2 |
| 6,360,025 B1 * | 3/2002 | Florent | 382/261 |
| 6,574,300 B1 * | 6/2003 | Florent et al. | 378/19 |
| 6,823,078 B1 * | 11/2004 | Florent et al. | 382/132 |

FOREIGN PATENT DOCUMENTS

DE    39 31 934 A1    4/1990

OTHER PUBLICATIONS

"Image Sequence Analysis," Huang, Ed., Chapter 7: Processing of Medical Image Sequences, Spiesberger et al. (1981) pp. 381-426.

* cited by examiner

*Primary Examiner*—Andrew W. Johns
(74) *Attorney, Agent, or Firm*—Schiff Hardin LLP

(57) ABSTRACT

In a method and apparatus for processing a radiation image sequence composed of a number of successively acquired radiation images acquired with a dynamic image converter, particularly a solid-state image detector, the images having been acquired with a radiation examination device in a fluoroscopic mode or in a digital cinematographic mode, the spatial frequency spectra of the individual images or frames are subjected to a signal-dependent, temporal filtering with separate filter functions and are merged for forming a filtered overall image.

15 Claims, 3 Drawing Sheets

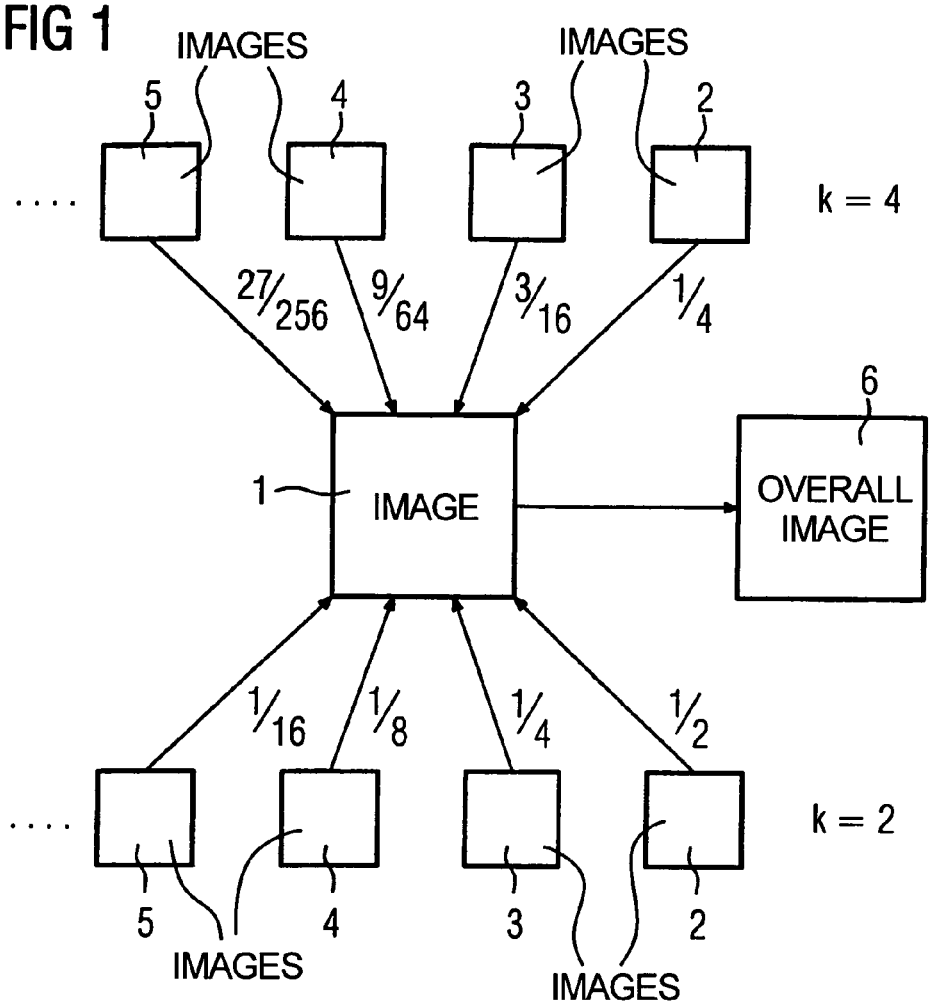
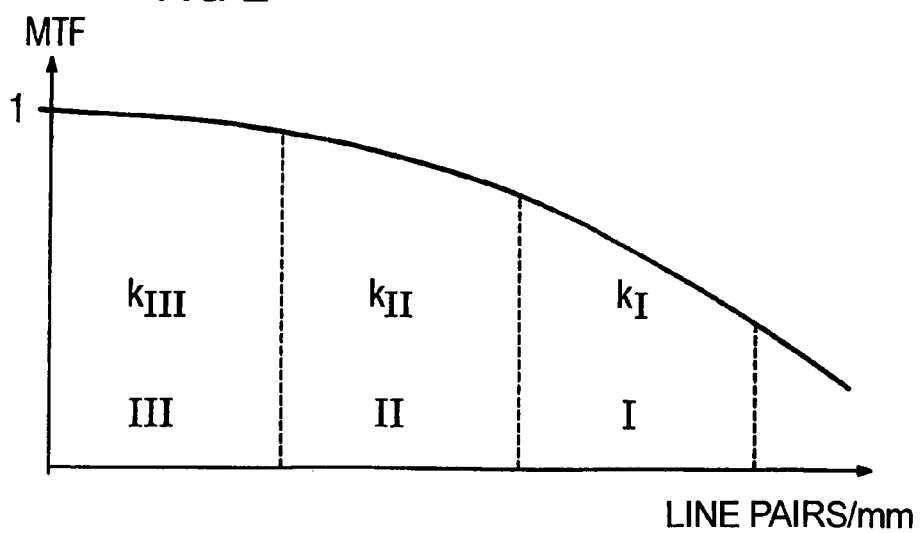

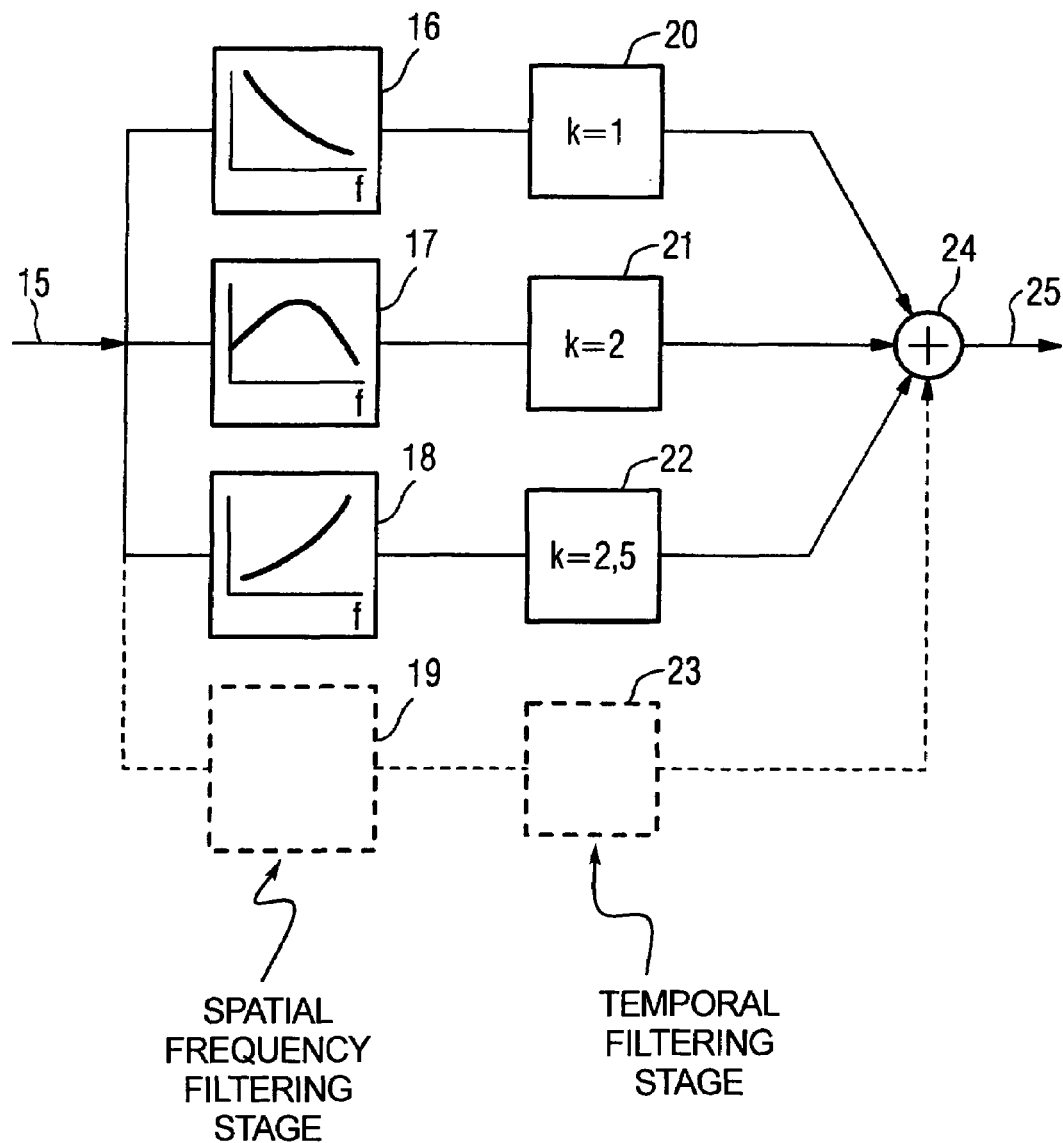

METHOD FOR PROCESSING A RADIATION IMAGE SEQUENCE COMPOSED OF A NUMBER OF SUCCESSIVELY ACQUIRED RADIATION IMAGES ACQUIRED WITH A DYNAMIC IMAGE CONVERTER

BACKGROUND OF THE INVENTION

1. Field of the Invention

The present invention is directed to a method for processing a radiation image sequence that is composed of a number of successively acquired radiation images acquired with a dynamic image converter, particularly a solid-state image detector, as well as to a medical examination apparatus operating according to such a method.

2. Description of the Prior Art

Radiation image exposures, particularly in the fluoroscopic mode, are utilized for the observation of dynamic events and for diagnosis. Low-power radiation is employed for this purpose. The voltage and the current of the radiation source, i.e. of the X-ray tube, must be set with the required contrast and the lowest possible dose for patient and examining person taken into consideration. The unavoidable presence of noise in the framework of the image acquisition plays an important part due to the relatively low radiation dose in the fluoroscopic mode. In the case of solid-state image detectors that are being increasingly employed, two noise sources exist, namely quantum noise and internal detector noise. Similar problems also occur in the digital cinematographic mode wherein images are registered with a higher dose over a shorter time span.

In order to compensate the influences of the noise as much as possible with respect to adequate image contrast and signal-to-noise ratio, it is known to subject the acquired images to a filtering; but this does not always lead to satisfactory results.

German PS 26 55 525 discloses the resolution of images of a sequence into different spectral components, which are merged preceding the integrating image memory, so that all spatial frequencies are temporally filtered in the same way.

German OS 39 31 934 discloses acquiring a packet of images with different focusing planes, with each image being subjected to a Fourier transformation. Subsequently, a selection of specific spatial frequencies occurs for each transformed image. These selected spatial frequency components are then added and subsequently back-transformed. This addition practically represents an overall time integration of the image packet.

German OS 198 49 090 and U.S. Pat. No. 5,880,767 disclose methods for processing input images wherein different spatial frequency components are selected from an image and added after weighting.

Spiesberger, W. et al., "Processing of Medical Image Sequences", in Huang, T. S., Image Sequence Analysis, Springer Verlag, 1981, pages 381 through 426, discloses a method for level-dependent temporal filtering, wherein a motion-dependent temporal averaging (for example, recursive filter with motion detector) ensues on the basis of relative levels between the individual images of a sequence at a specific image location (picture element).

SUMMARY OF THE INVENTION

An object of the present invention is to provide an image processing method that allows an improvement of the image quality as a result of adequate noise suppression in the fluoroscopic mode.

For solving this problem in accordance with the invention, in a method of the type initially described that the spatial frequency spectra of the individual images or frames are subjected to a signal-dependent, temporal filtering with separate filter functions and are merged for forming a filtering overall image. Thus result in noise contained in the images, particularly due to signals with low levels or with high frequencies, being more temporally filtered than the remaining signal parts of the image, so that the noise is suppressed, whereas the image-relevant components are not temporally filtered or are only slightly temporally filtered.

In an embodiment of the invention the spatial frequency spectrum of each radiation image is resolved into a number of spectral ranges that are separately subjected to a temporal filtering with separate filter functions, after which the filtered spectral ranges are merged to form a filtered, overall image.

With particular advantage, in the inventive method the individual and separate temporal filtering of selected spectral ranges over the entire spatial frequency spectrum. To this end, the spatial frequency spectrum of all individual images or frames of a sequence is resolved into a plurality of identical spectral ranges for each individual image or frame, for example two, three or four spectral ranges. The respective, identical spatial frequency spectra of the individual images from the sequence are now separately filtered with a temporal filtering with separate, different filter function, i.e. the contents of these images are mixed (for example, recursive filters with sliding weighted averaging, GGM). In the temporal filtering, specific components from the spatial frequency spectrum, that are defined by the k-value or k-factor, are united in the overall image from successively acquired images of the image sequence. The k-value defines the percentage share of the current image and the past images in the overall image. By means of different k-values, which corresponds to separate filter functions, for example, the component of the corresponding spatial frequencies of images, that were acquired chronologically earlier in the respective spectral range in the filtered overall image is thus varied in the present method and united to form an overall image. In this way, thus, the overall image can be formed of arbitrarily filtered, individual spectral ranges, with the individual spectral ranges having been subjected to different filterings (i.e. different k-values). This corresponds to recursive filterings with different k-factors. After the results of the temporal filtering of the individual spectral ranges are present, these are re-united to form an overall image having the complete spatial frequency spectrum. This results in the noise being differently suppressed in the different spectral ranges.

For example, very high-frequency noise can be subjected to stronger temporal filtering, i.e. a high k-value is selected, so that the parts of the images that were acquired chronologically earlier enter more strongly into the overall image than given a low k-value. This leads to lower noise, with the sharpness being fully preserved when the subject is at rest. This processing is compatible with the physiology of human vision, whereby fine structures are poorly recognized anyway given motion. For example, the very low-frequency spatial frequency component can likewise be subjected to a higher temporal filtering, which leads to a steadying of the image for large-area changes in the contrast and the brightness.

In the case X-ray systems, for example, this results in the high spatial frequencies of the images that contain the noise being subjected to stronger temporal averaging, and thus fine noise is more strongly suppressed. The lower spatial frequencies are averaged less in the example, so that movements of coarser structures are smeared less.

In contrast thereto, in a further embodiment of inventive method, the spatial frequency spectra of the individual images are subjected to a level-dependent temporal filtering with level-dependent filter functions and are merged for forming a filtered, overall image.

Here, thus, the temporal filtering ensues dependent on the respective, absolute signal level. Viewed in relative terms, for example, the additive part of the electronic noise in relationship to the quantum noise is significantly higher in dark image regions than in bright image regions. Moreover, these regions with a low quantum number are usually strongly boosted in terms of contrast. If a stronger temporal averaging then ensues, for example, in darker image regions, i.e. given low signal levels, than in the brighter image regions, then the subjective image impression is likewise improved since the image noise is more strongly suppressed in the dark image regions. This takes into consideration the fact that fewer X-ray quanta are present in dark image regions in X-ray images, i.e. that more noise can be seen in the unprocessed image. The selection of the image region can ensue pixel-dependently for each individual image, or smaller or larger level steps can be defined wherein a specific temporal filtering is then applied.

In a version of the second embodiment of the invention the spatial frequency spectrum of each individual image be resolved into a number of spectral ranges that are respectively temporally filtered level-dependently and subsequently combined for forming the overall image. Here, the possibility of resolving the spatial frequency spectrum is also utilized in order to separately filter smaller spectral ranges level dependent, which leads to a further improvement of the noise suppression.

In a further version of the inventive method that is applicable to both of the aforementioned embodiments, the selection of the filter functions employed is made dependent on the examination modality employed and/or dependent on the operating parameters of the radiation examination device employed for the acquisition of the image sequence and/or dependent on an analysis result of the acquired image sequence in view of a potential movement on the part of the examination subject and/or dependent on a sensor signal of a sensor element that detects a potential subject movement. A distinction is thus made in terms of the filter functions employed as to which examination modalities, i.e. what type of radiation examination device, is employed. A selection also can be made dependent on the employed operating parameters, particularly the operating voltage and the operating current of the X-ray source. A further selection criterion is generally the fact of whether a movement on the part of the subject is present within the acquired image sequence. If the subject has moved, which can be detected, for example, by means of an analysis of the acquired image sequence or by means of a separate sensor element, then only the most recently acquired images wherein the subject again was still utilized for the formation of the overall image.

In a further version of the inventive method relating to both embodiments an amplitude boost is undertaken in the spatial frequency spectrum for edge enhancement in the overall image, before or after the temporal filtering. Thereafter, the filtering of the entire spatial frequency spectrum, boosted in a specific spectral range, ensues, namely on the basis of the initially described embodiments of the invention. An edge enhancement thus occurs that also can be dependent on the currently selected degree of the temporal filter function in a (small) image region. A clear edge enhancement is likewise possible, for example in the case of standing subjects, which is when the temporal frequency generally can be selected highest.

Overall, the invention allows an arbitrary combination between edge enhancement and temporal filtering, level dependent and for individual spectral parts. The proposed filter algorithms, which are optimally adapted, lead to a better image quality, i.e. the signal-to-noise ratio or the relationship of noise to local contrast is improved. Different parameter combinations can be stored in organ programs.

The above objects also are achieved in accordance with the invention in a medical radiation examination device that is fashioned for the implementation of the above-described method.

DESCRIPTION OF THE DRAWINGS

FIG. 1 is an illustration for explaining the basic principles of temporal filtering.

FIG. 2 is a schematic illustration of a spatial frequency spectrum with separate spectral regions that are subjected to a separate temporal filtering.

FIG. 6 is a block diagram of the processing which takes place in the examination device of FIG. 5.

DESCRIPTION OF THE PREFERRED EMBODIMENTS

Figure 3:
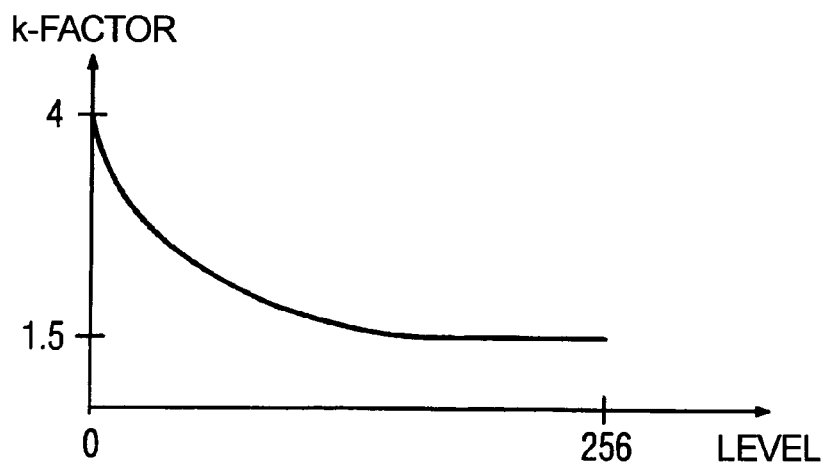
FIG. 3 is a diagram for explaining the level-dependent filtering of the spatial frequency spectrum.

FIG. 1 shows the temporal filtering of an image sequence in the form of a schematic illustration. An image sequence with a number of successively acquired images was produced, with a most recently acquired image 1 and images 2, 3, 4, 5 acquired earlier in chronological succession being shown in the illustrated exemplary embodiment. In the framework of the temporal filtering, a filter factor, referred to as a k-value, is then defined that indicates the proportions with which the spatial frequency spectra of the images acquired chronologically earlier are mixed with the spatial frequency spectrum of the most recently acquired image 1, and a filtered image 6 is generated therefrom. The respective proportion given a k-factor of k=4 is shown by example in the upper part of FIG. 1. Contributions of $\frac{1}{4}$ from the spectrum of the image 2, $\frac{3}{16}$ from the spectrum of image 3, $\frac{9}{64}$ from the spectrum of the image 4, $\frac{27}{256}$ from the spectrum of image 5 are mixed as proportion with the spectrum of image 1. Of course, the other images (not shown) acquired earlier in time are also correspondingly continuously added with their respective proportions.

The respective image parts are different given a lower k-factor. The exemplary case for a k-factor of k=2 is shown in the lower part of FIG. 1. Here, contributions of $\frac{1}{2}$ from image 2, $\frac{1}{4}$ from image 3, $\frac{1}{8}$ from image 4 and $\frac{1}{16}$ from image 5 are also incorporated, the overall image 6 being produced based thereon. It is thus clear that the share of the images respectively acquired early in time in the overall image can be selected by means of a corresponding selection of the k-value. The noise component is suppressed up to a certain degree by means of corresponding, temporal averaging.

FIG. 2 shows a diagram of an arbitrary spatial frequency spectrum of an acquired image, for example image 1. The line pairs/millimeter are entered along the abscissa and the modulation transfer function (MTF) is entered along the ordinate. The curve represents the spatial frequency spectrum.

This spatial frequency spectrum is now inventively divided into a number of spectral ranges, i.e., into the spectral ranges I, II and III in the illustrated exemplary embodiment. As explained with reference to FIG. 1, each of these spectral ranges is temporally filtered, with a separate k-value, i.e. a separate filter function being selected for each spectral range.

In the illustrated example, these values are the k-values kI, kII and kIII. For example, kI=2, kII=3 and kIII=4 can be selected, i.e. the higher-frequency image parts in the spectral range I are temporally filtered to a lesser extent than the lower-frequency parts in the range III. Of course, the selection of the k-values can also be different; identical k-values can also be employed in two or more ranges, etc. Of course, the division of the frequency spectrum into three spectral ranges can also be arbitrarily modified.

Thus a significantly finer filtering can ensue than would be achieved with a pure temporal filtering wherein each spatial frequency spectrum is filtered overall with a uniform k-value or, respectively, a uniform filter function.

FIG. 3 is a diagram showing a level-dependent filtering. The level is entered along the abscissa (between 0 and 256 in the illustrated example) and the k-factor is entered along the ordinate. The filtering or the selection of the k-factor, and thus of the respective filter function that forms the basis for the respective signal level, then ensues dependent on the signal level. The highest k-factor, k=4 in the illustrated example, is established given a level of 0; the level curve then asymptotically approaches the lowest k-factor, k=1.5 in the illustrated example.

It is now possible to filter each spectral range I, II and III from FIG. 2 level-dependent in the described way, i.e. no fixed k-values are selected; on the contrary, they are derived according to the corresponding level curve in the respective spectral range of the spatial frequency spectrum.

Figure 4:
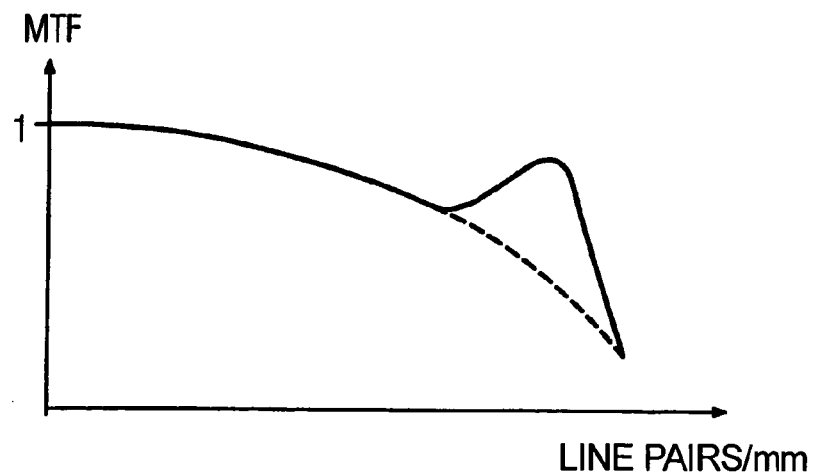
FIG. 4 is a diagram showing a variation of the spatial frequency spectrum for edge enhancement.

FIG. 4 shows a spatial frequency spectrum in the form of a diagram, wherein edge enhancement, i.e. a modification for enhancing edges, was implemented. In the illustrated example, the high-frequency spectral part was boosted, as the solid line toward the end shows compared to the broken line of the spatial frequency curve that was originally not boosted. This boosted frequency spectrum can now be subjected to the filter modes described in FIGS. 2 and 3.

Figure 5:
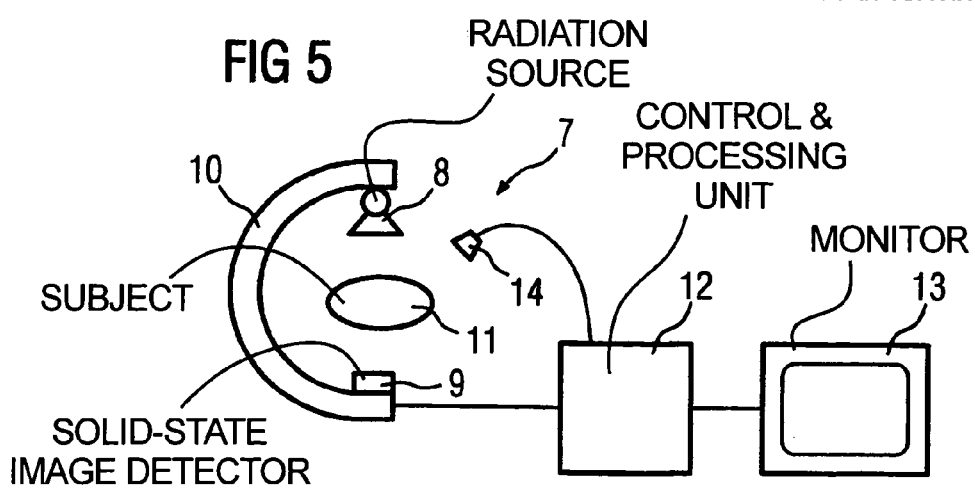
FIG. 5 is a schematic illustration of an inventive radiation examination device.

FIG. 5 shows an inventive medical radiation examination device 7 composed of a radiation source 8 and a solid-state image detector 9 that are both movable arranged in common at a C-arm 10. A examination subject 11 that is examined in a fluoroscopic mode or digital cinematographic mode is located between them. The dynamically acquired images are forwarded to a control and processing unit 12 that has an image processing stage in which the dynamically acquired images are processed using suitable algorithms for the purpose of the above filter modes in order to produce a filtered overall image and output it at a monitor 13. The filter or processing algorithms are appropriately designed dependent on the extent and sensitively of the filtering that are to ensue, i.e. whether only the filtering described in FIG. 2 by dividing the spatial frequency spectrum into various spectral ranges using fixed k-values is to ensue, or whether the additional level-dependent filtering is also to simultaneously ensue.

Further, a sensor element 14 is provided that serves the purpose of monitoring movement on the part of the examination subject 11. As soon as such a movement is detected, this is forwarded to the control and processing unit 12 since the previously acquired images then show the subject in a different position and these images cannot be mixed with subsequently acquired images with an examination subject that is at rest but in a different position. Instead of the sensor element 14, it is also possible for the control and processing unit to have suitable analysis algorithms available to it with which the dynamically acquired images can be analyzed in view of subject movement, and the moment when the subject is again at rest can be identified, and consequently the subsequently acquired images again can be employed.

FIG. 6 shows the principle of the processing portion of the control and processing unit 12 in greater detail. The digitized signals of an image sequence supplied by the solid-state image detector 9 are supplied to the device in FIG. 6 at the input 15 and are distributed onto the individual filter stages 16 through 19 for spatial frequency filtering. The filter stage 16 only allows the low frequencies to pass. The filter stage 17, for example, filters the high and low spatial frequency ranges out, whereas the filter stage 18 only allows the high frequencies to pass. The filter stage 19 indicated with broken lines is intended to symbolize that even more filter stages can be present.

The outputs of the filter stages 16 through 19 for the spatial frequency filtering are connected to filter stages 20 through 23 for temporal filtering, for example for recursive filtering with different k-factors. For example, the lower frequency parts of the individual image 1 through n from the filter stage 16 are recursively filtered in the filter stage 20 with a k-factor of k=1. The middle spatial frequencies of the filter stage 17 are filtered in the filter stage 21 with a factor of k=2, and the high frequencies of the filter stage 18 are filtered in the filter stage 22 with a factor of k=2.5.

The output signals of the filter stages 20 through 23 are supplied to an adder 24, so that the images 1 through n are recombined. After possible further image processing, the output 25 of the adder 24 is supplied to the monitor 13.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for processing a radiation image sequence composed of a plurality of successively acquired radiation images, acquired with a dynamic image converter in a fluoroscopic mode or in a digital cinematographic mode, each of said images comprising a spatial frequency spectrum, said method comprising the steps of:

subjecting the respective spatial frequency spectra of said images to a signal-dependent, temporal filtering with respectively separate filter functions, thereby obtaining a plurality of individual filtered images; and merging said plurality of individual filtered images to form an overall filtered image.

2. A method as claimed in claim 1 comprising resolving each spatial frequency spectrum of each of said images into a plurality of spectral ranges, and separately subjecting said spectral ranges in each image to said temporal filtering with separate filter functions, thereby obtaining a plurality of filtered spectral ranges, and merging said filtered spectral ranges to form said overall filtered image.

3. A method as claimed in claim 1 wherein the step of subjecting the respective spatial frequency spectra of said individual images to a signal-dependent temporal filtering with separate filter functions comprises subjecting the spatial frequency spectra of the individual images to a level-dependent temporal filtering with level-dependent filter functions.

4. A method as claimed in claim 3 comprising resolving the spatial frequency spectrum of each of said individual images into a plurality of spectral ranges, and respectively subjecting said spectral ranges to said level-dependent temporal filtering, thereby obtaining a plurality of filtered spectral ranges, and merging said filtered spectral ranges to form said overall filtered image.

5. A method as claimed in claim 1 comprising selecting said separate filter function respectively for said spatial frequency spectra of said individual images dependent on at least one of an examination modality employed to generate said images, operating parameters of a radiation examination device which includes said dynamic image converter, an analysis result of said image sequence as to movement of a subject for which said images were acquired, and a sensor signal of a movement sensor for detecting movement a subject for which said images were acquired.

6. A method as claimed in claim 1 comprising, before subjecting said spatial frequency spectra of said individual images to said signal-dependent, temporal filtering with separate filter functions, subjecting the respective spatial frequency spectra of said individual images to an amplitude boost for edge enhancement in said overall filtered image.

7. A medical radiation examination apparatus comprising:
a radiation source adapted to irradiate a subject, thereby producing attenuated radiation;
a dynamic image converter for acquiring said attenuated radiation;
a control and evaluation unit for operating said radiation source and said dynamic image converter in a mode selected from the group consisting of a fluoroscopic mode and a digital cinematographic mode, to obtain an image sequence composed of a plurality of radiation images successively acquired by said dynamic image converter, each of said radiation images having a spatial frequency spectrum; and
said control and evaluation unit being supplied with said image sequence and subjecting the respective spatial frequency spectra of said images to a signal-dependent temporal filtering with respectively separate filter functions, thereby producing a plurality of filtered images, and merging said plurality of filtered images to form an overall filtered image.

8. An apparatus as claimed in claim 7 wherein said control and evaluation unit resolves each spatial frequency spectrum of each of said images into a plurality of spectral ranges, and separately subjects said spectral ranges in each image to said temporal filtering with separate filter functions, thereby obtaining a plurality of filtered spectral ranges, and merges said filtered spectral ranges to form said overall filtered image.

9. An apparatus as claimed in claim 7 wherein said control and evaluation unit subjects the respective spatial frequency spectra of said individual images to a signal-dependent temporal filtering with separate filter functions by subjecting the spatial frequency spectra of the individual images to a level-dependent temporal filtering with level-dependent filter functions.

10. An apparatus as claimed in claim 7 wherein said control and evaluation unit resolves the spatial frequency spectrum of each of said individual images into a plurality of spectral ranges, and respectively subjects said spectral ranges to said level-dependent temporal filtering, thereby obtaining a plurality of filtered spectral ranges, and merges said filtered spectral ranges to form said overall filtered image.

11. An apparatus as claimed in claim 7 wherein said control and evaluation unit selects said filter function dependent on the selected mode used to produce said radiation image sequence.

12. An apparatus as claimed in claim 7 wherein said control and evaluation unit operates said radiation source with operating parameters in said mode for producing said radiation image sequence, and wherein said control and evaluation unit selects said filtered functions dependent on said operating parameters.

13. An apparatus as claimed in claim 7 wherein said control and evaluation unit analyzes said image sequence to determine whether movement of said subject has occurred during said image sequence, and thereby obtains a movement analysis result, and wherein said control and evaluation unit selects said filter functions dependent on said movement analysis result.

14. An apparatus as claimed in claim 7 comprising a sensor disposed to detect movement of said subject during the acquisition of said image sequence and to generate a sensor signal dependent on detected movement of said subject, and wherein said control and evaluation unit selects said filter functions dependent on said sensor signal.

15. An apparatus as claimed in claim 7 wherein said control and evaluation unit, before subjecting said spatial frequency spectra of said individual images to said signal-dependent, temporal filtering with separate filter functions, subjects the respective spatial frequency spectra of said individual images to an amplitude boost for edge enhancement in said overall filtered image.

* * * * *